March 6, 1934. W. B. RITTER 1,949,659
RUG SHAMPOOING MACHINE
Filed May 19, 1932 5 Sheets-Sheet 1

INVENTOR
William B. Ritter
By W. W. Williamson Atty.

March 6, 1934.  W. B. RITTER  1,949,659
RUG SHAMPOOING MACHINE
Filed May 19, 1932  5 Sheets-Sheet 2
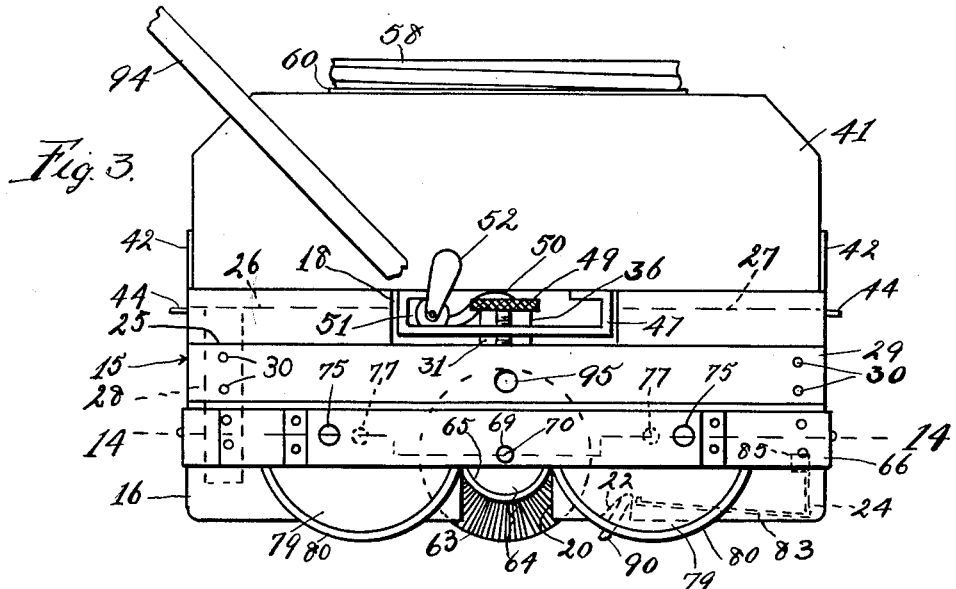
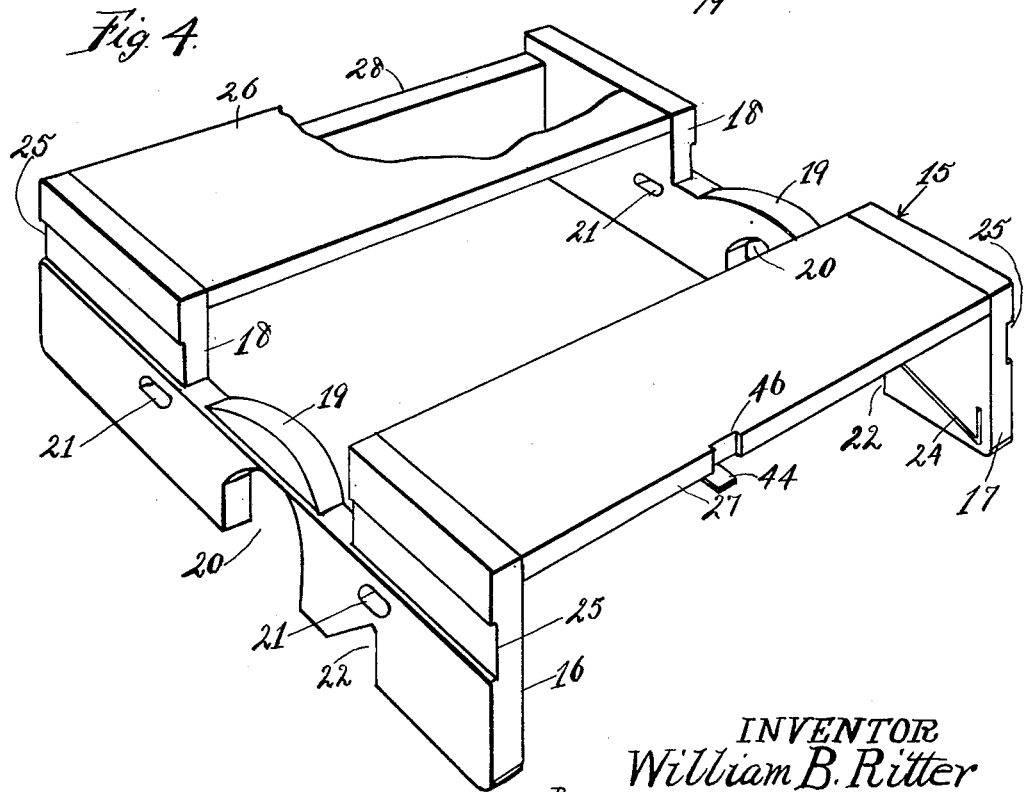
INVENTOR
William B. Ritter
By W. W. Williamson
Atty.

March 6, 1934.   W. B. RITTER   1,949,659
RUG SHAMPOOING MACHINE
Filed May 19, 1932   5 Sheets-Sheet 3

INVENTOR
William B. Ritter
By W. W. Williamson
Atty.

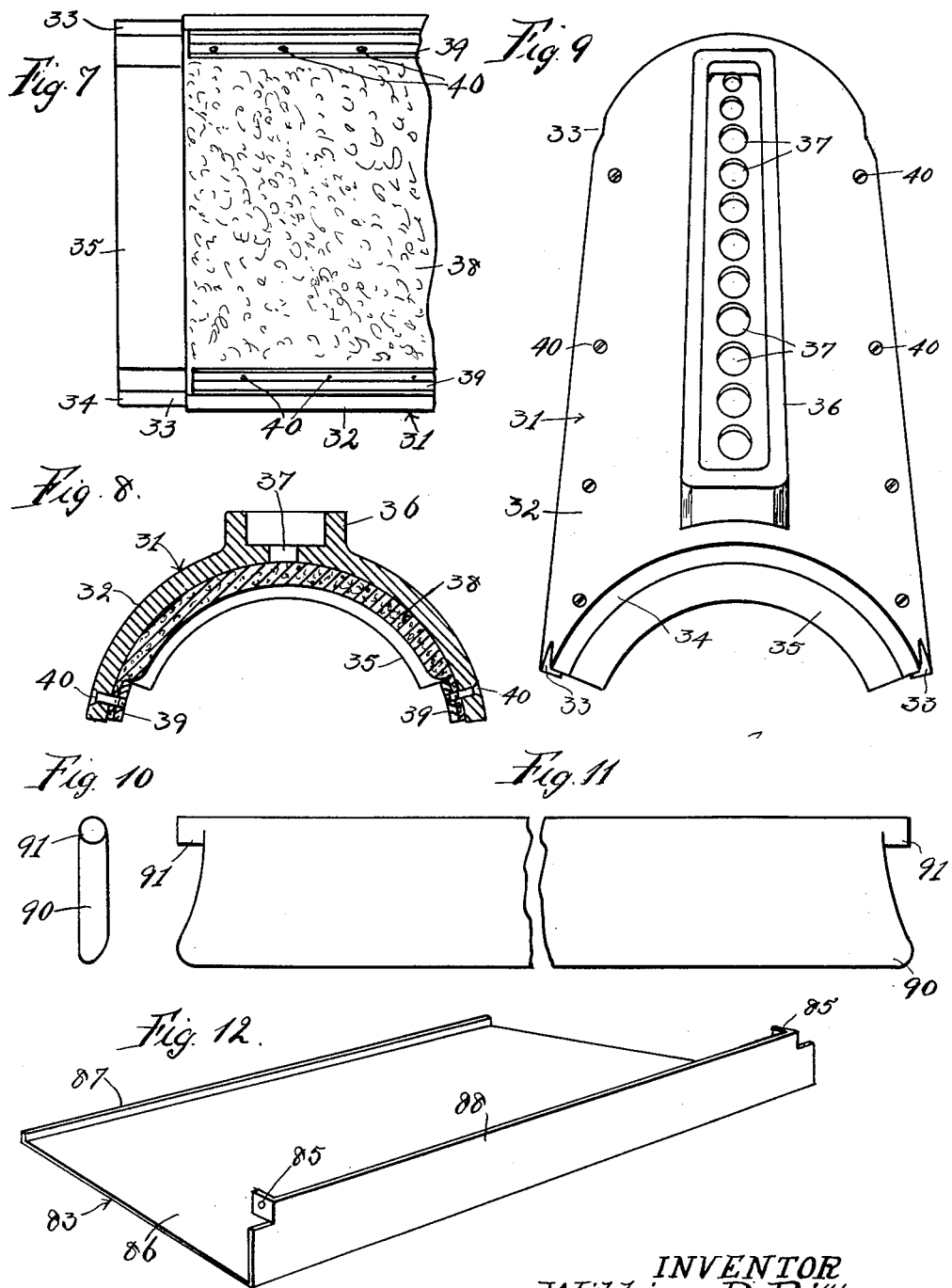

March 6, 1934.  W. B. RITTER  1,949,659
RUG SHAMPOOING MACHINE
Filed May 19, 1932  5 Sheets-Sheet 5

INVENTOR
William B. Ritter
By W. W. Williamson
Atty.

Patented Mar. 6, 1934

1,949,659

UNITED STATES PATENT OFFICE 1,949,659

RUG SHAMPOOING MACHINE

William B. Ritter, Philadelphia, Pa., assignor of one-half to Thompson D. Ritter, Philadelphia, Pa.

Application May 19, 1932, Serial No. 612,228

11 Claims. (Cl. 15—40)

My invention relates to new and useful improvements in a rug shampooing machine, and has for one of its objects to provide means to produce suds as the cleansing liquid is fed to the brush.

I have found that very good results are obtained in cleaning rugs and carpets if suds are produced from the cleansing liquid since the dirt dissolving action of the liquid is hastened without making the rug or carpet soaking wet. If the suds are produced prior to application of a brush it is practically impossible to feed them from a container and if the suds are subsequently produced then the rug or carpet is moistened to an excessive degree.

I overcome these objections by forming the suds during the feeding of the cleaning liquid to the brush by passing the brush across an applicator of porous sponge rubber or other suitable material through which the cleansing liquid passes as it flows from a container.

Therefore another object of the invention is to provide a new method of applying a cleansing fluid by machine to an article to be cleaned.

Another object of this invention is to construct an inexpensive light and efficient rug shampooing machine which may be readily operated by hand.

Another object of the invention is to provide means for removing the surplus cleansing fluid after being applied to a rug or carpet.

Another object of the invention is to provide for assembling the drive wheels without the use of fastening devices whereby they may be readily installed or removed when inserted or desired.

A further object of the invention is to provide a unique cleansing fluid applicator.

A still further object of the invention is the provision of a feed which will evenly distribute the cleansing fluid to the applicator.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 3 is an end view or side elevation thereof.

Fig. 4 is a perspective view of the body frame with a part of one of the top slats broken away to illustrate a detail of construction.

Fig. 7 is an enlarged fragmentary inner face view of the applicator.

Fig. 8 is a cross section of Fig. 7.

Fig. 9 is a perspective view of said applicator looking at one end thereof.

Fig. 10 is an enlarged end view of the scraper bar.

Fig. 11 is a face view of the same.

Fig. 12 is a perspective view of the tray which holds an absorbent material to receive surplus cleansing liquid as it is removed from the rug.

Figure 1:
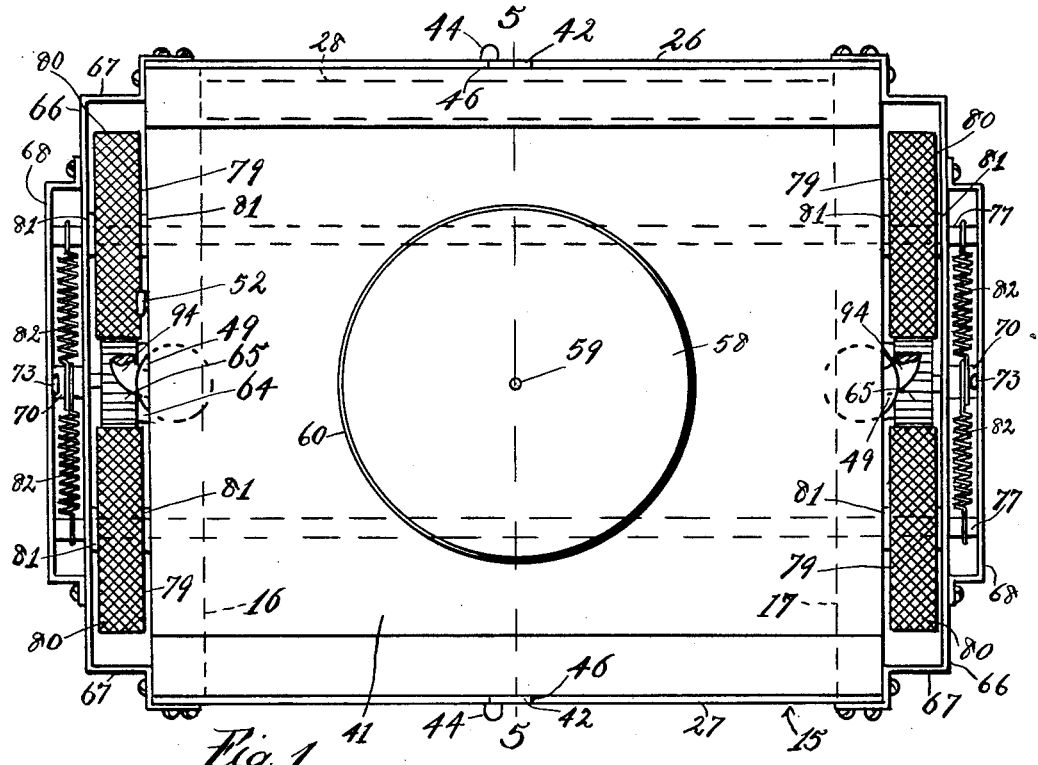
Fig. 1 is a top plan view of a rug shampooing machine constructed in accordance with my invention, the operating handle being broken off.
Figure 2:
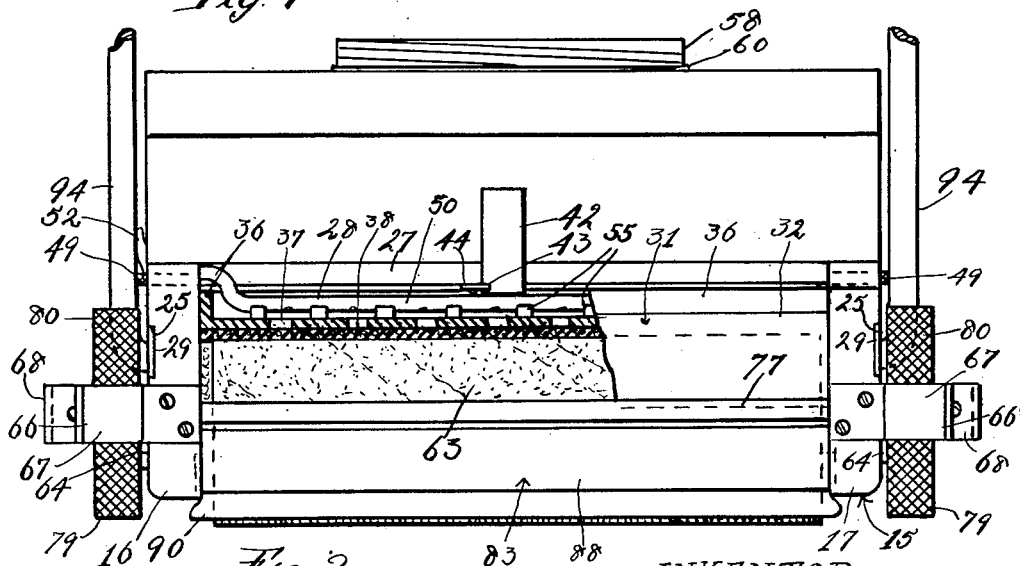
Fig. 2 is a front elevation thereof.

In carrying out my invention as herein embodied, 15 represents the body frame comprising a pair of parallel sides 16 and 17 fashioned to provide applicator receiving apertures 18 at their upper edges intermediate the front and back ends thereof with curved projections 19 within said apertures. Directly below the curved projections are formed brush spindle receiving apertures 20 in the lower edges of said side walls and to both sides of said brush spindle receiving apertures are formed longitudinal axle receiving slots 21. At suitable points between the brush spindle receiving apertures 20 and the forward ends of the sides are formed notches 22 to receive the ends of the scraper bar, to be presently described, and communicating with these notches are holes 23, Fig. 5. In the inner surfaces of the sides between the scraper bar receiving notches and the forward ends of said sides are formed tray receiving angular grooves 24. In the outer faces of the sides are formed longitudinal grooves 25 so positioned that when metal straps, to be later described, are placed therein they will project across applicator receiving apertures 18.

Between the sides 16 and 17 are mounted the top slats 26 and 27, preferably with their top surfaces flush with the upper edges of said sides and each of said slats is preferably of a width equal to the distance between an applicator receiving aperture and the adjacent end of one of the sides so that said top slats are spaced apart or separated a distance equal to the width of the applicator receiving apertures 18. To the rear ends of the sides beneath the top slat 26 is secured a rear wall or slat 28.

In each of the longitudinal grooves 25 are mounted metal straps 29 held in place by suitable fastening devices 30 and said metal straps 29 extend across the lower parts of the applicator receiving apertures 18 and form outer side walls to said apertures and act as stops for the applicator 31, since when said applicator is in place the ends thereof lie adjacent or even engage the inner faces of the straps 29.

The applicator comprises a rigid arcuate body 32 which may be produced from a casting and all four corners are notched or cut back as indicated at 33 to define an extension 34 at each end and on the under-surface of each extension is mounted a suitable pad 35 of any desirable compressible material, such as soft rubber, and when the applicator is positioned on the body frame the pad 35 rests upon the arcuate projections 19 with the part of the body of the applicator between the extensions lying between the side walls of the body frame of the machine.

When the applicator is assembled in the machine, the convex side is downward and along the longitudinal center or the outside top of said applicator is formed a trough 36 which terminates short of both ends of the applicator body and the interior of said trough is in communication with the concaved side or inside of the applicator body through a series of holes 37 in order to permit a cleansing fluid to flow from the trough to the rough porous applicator mat 38 which may be produced from sponge rubber of the type used for washing purposes and this applicator mat is fixed to the concave surface of the applicator body with its longer edges fastened in place by clamping strips 39 coacting with the inner surface of the applicator body and held in place by screws 40 or other equivalent fastenings.

On top of the machine body frame is mounted a suitable container or tank 41 provided with pendant keepers 42 having notches 43 to be engaged by the pivoted latches 44, pivoted as at 45 to the undersides of the top slats 26 and 27 which preferably are notched as at 46 to receive said keepers.

At each end of the tank or container 41 and depending therefrom is a hollow hanger 47 which registers with an applicator receiving aperture 18 and in each hanger is threaded a set screw 49 for engagement with an extension 34 of the applicator body in order to force said applicator downward against the arcuate projections 19 and compress the pads 35 sufficiently to cause the rough porous mat 38 into contact with the brush to be later described.

On the underside of the container 41 along its longitudinal center between the hangers 47 is mounted a distributing or feed tube 50 one end of which communicates with a valve 51 which in turn communicates with the interior of the container in order to regulate the supply of cleaning fluid which will flow from the container to and through said feed pipe and said valve is provided with an operating handle 52. The opposite end of said distributing or feed pipe is anchored as at 53 to the underside of the tank. At intervals along said distributing or feed pipe are formed apertures 54 which permit the cleansing fluid to flow from the feed pipe throughout its length and in order to prevent said fluid from running any great distance along the pipe and possibly dripping therefrom from any one or two points, I dispose drip members 55 at intervals along the underside of said pipe.

Figure 5:
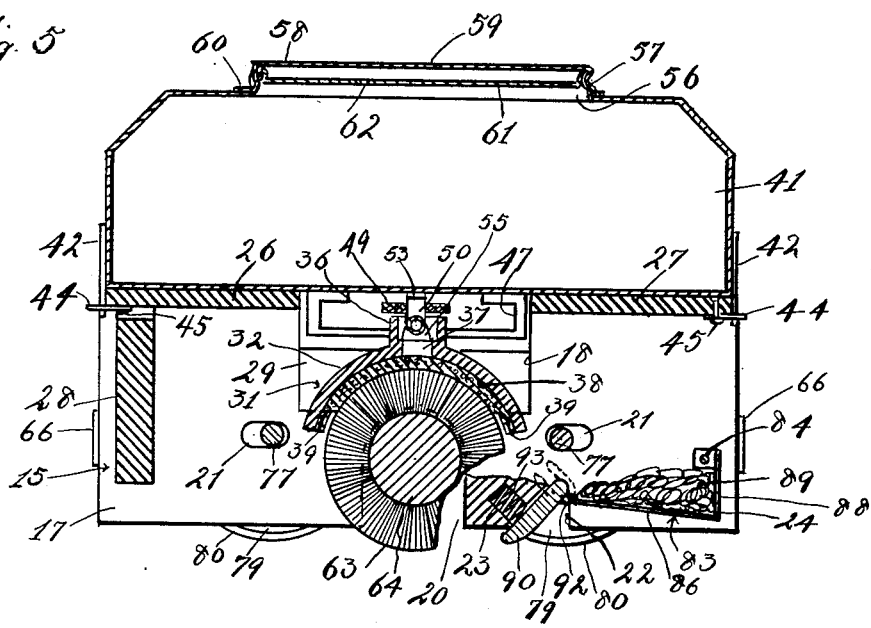
Fig. 5 is a section on the line 5—5 of Fig. 1.
Figure 6:
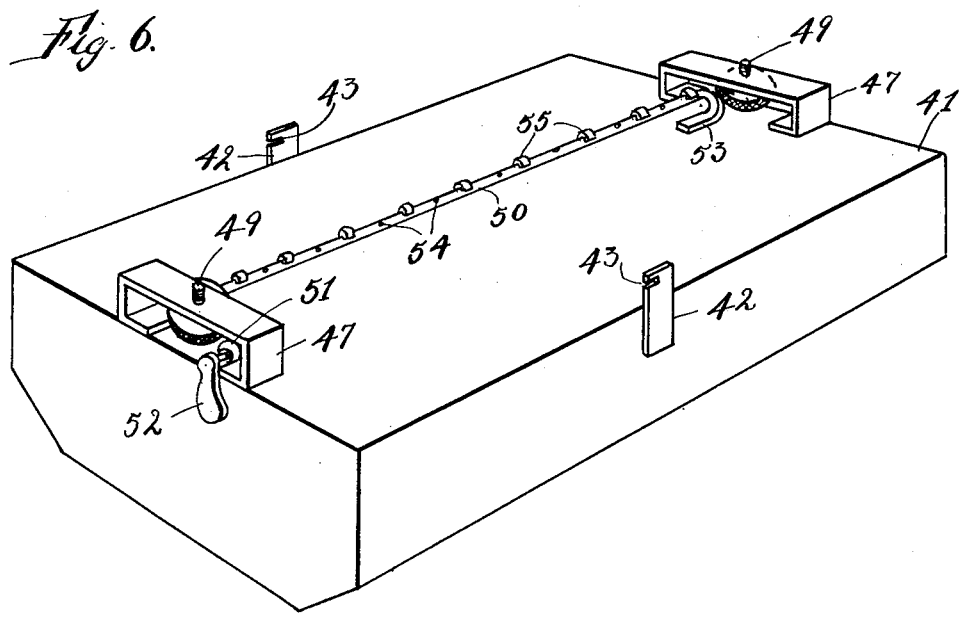
Fig. 6 is a perspective view of the cleansing liquid container in an inverted position.
Figure 13:
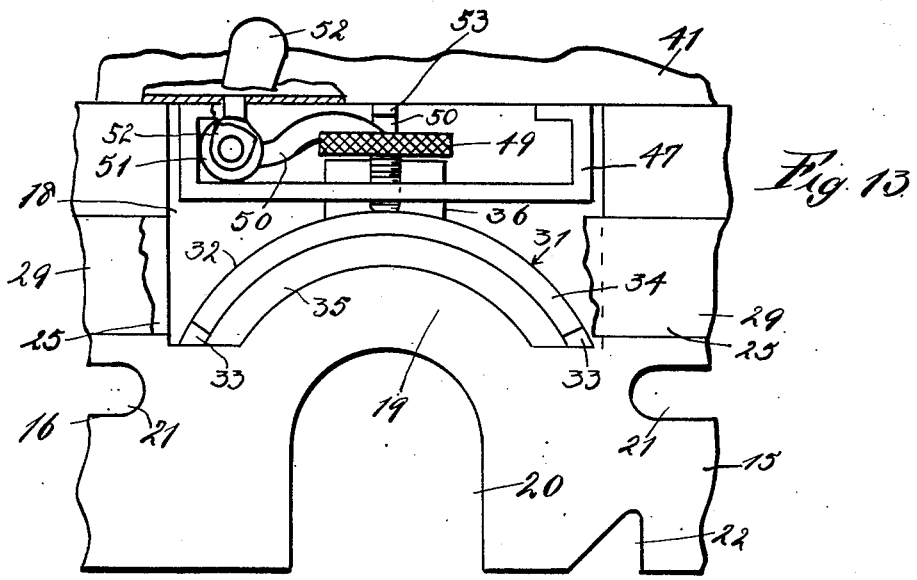
Fig. 13 is an enlarged fragmentary view of one side or end of the machine with parts broken away and other parts entirely removed for illustrating certain details of construction.
Figure 14:
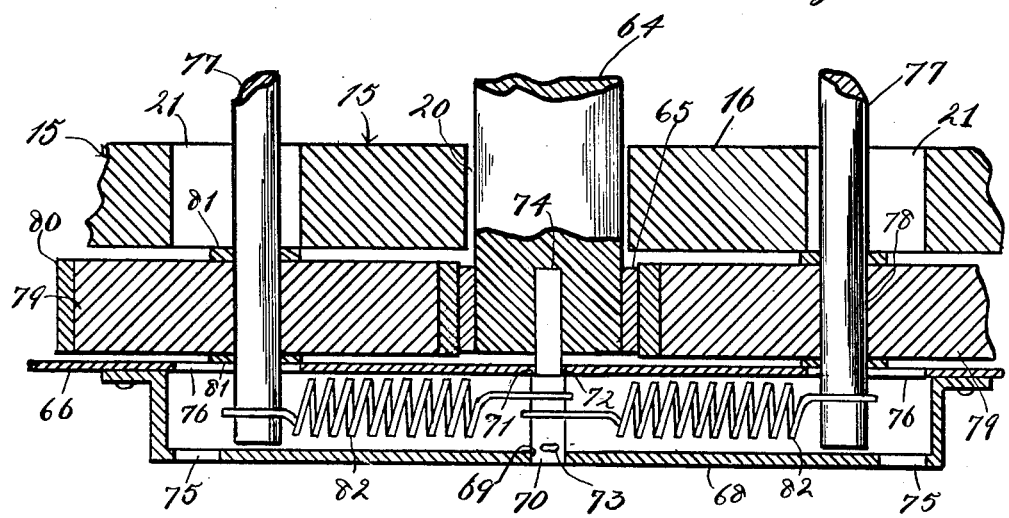
Fig. 14 is an enlarged fragmentary sectional view on the line 14—14 of Fig. 3, to particularly illustrate the arrangement of the wheel shafts and the brush spindle.

As will be obvious by reference to Fig. 5, when the container is assembled on the body frame of the machine said feed or distributing pipe 50 will lie in the trough 36 of the applicator, so that the cleansing fluid flowing from the container 41 must run into the trough and be fed to the applicator mat.

The container is provided with a filling opening 56, surrounded by a threaded flange 57 on which is screwed a cap 58 having a vent opening 59 and when said cap is in place the edge thereof will engage a compressible washer or gasket 60 surrounding the flange 57. In order to prevent the egress of liquid through the vent opening 59 a secondary or supplementary inner cap 61 is provided which rests upon the flange 57, and said secondary cap has a vent opening 62 offset from or in staggered relation to the vent opening 59.

The brush 63 including a spindle 64 has the ends of said spindle mounted in the apertures 20 with the ends of said spindle projecting beyond the outer surfaces of the machine frame side walls 16 and 17, and on said projecting ends are mounted corrugated or other suitable tires or bands 65.

At each side of the machine frame body is mounted a bearing strap 66 having legs 67 at the ends in order to space the main or major part of each strap from the side wall on which it is mounted, and said legs are preferably formed angular so as to pass around the ends of a side wall as plainly shown in Fig. 1, and on each of these straps 66 is mounted a housing strap 68, the major portion of which is spaced from the main part of the strap 66.

In each strap 68 is a hole 69 to receive a trunnion 70 which trunnion is of two different diameters in order to provide a shoulder 71 which will rest against the strap 66 when the part having the smaller diameter is projected through a hole 72 in said strap 66 and which hole 72 is smaller than the hole 69 so that by placing a cotter pin 73 through the trunnion inside of the strap 68, said trunnion will be held against lengthwise movement in both directions. The smaller part of the trunnion then projects into a socket 74 in an end of the brush spindle 64 so that said brush is journalled for rotation. It is to be understood that where the brush spindle is of wood the socket 74 may be provided with a bushing to act as a bearing.

Adjacent each end of the strap 68 is formed a hole 75 which is of such size that it will align with only one end of an adjacent slot 76 formed in the strap 66 and said slot 76 is substantially co-extensive with a slot 21 in an adjacent side wall of the machine frame body.

This construction makes it possible for an axle 77, of which there are two, to be inserted endwise through a hole 75, a slot 76 and then through the hole 78 in the hub of a driving wheel 79, then through a slot 21 in a side wall, as 16, and then on across the machine frame and through similar parts on the opposite side of said machine frame and when the axle is in place both ends thereof will be inside of the straps 68 on opposite sides of the machine and by moving it toward the brush it will be moved out of alignment with the holes 75 and thereby prevent accidental displacement of the shaft since endwise movement thereof will cause an end to engage a strap 68.

The drive wheels are provided with suitable tires 80, preferably roughened in order to frictionally engage the tires or bands 65 on the ends of the brush spindle as well as the surface over which the machine is operated. If found desirable, washers 81 may be placed on both sides of the drive wheels.

In order to maintain the drive wheels in contact with the brush spindle, or more particularly the tires of said drive wheels in contact with the tires on the brush spindle, springs 82 are positioned between the straps 66 and 68 with one end of each spring attached to an end of each axle and the other end of each spring attached to a trunnion 70.

A tray 83 is mounted at what I call the front end of the machine within the same between the two side walls adjacent the lower edges thereof and the side edges of said tray are preferably set in the tray receiving grooves 24 and held in place by fastening devices 84 passing through ears 85 and into the side walls 16 and 17. The bottom 86 of the tray is in an inclined position as shown in Fig. 5, and preferably has a lip 87 at its rear end and a vertical wall 88 at its forward end and said tray will hold a quantity of suitable absorbent material 89, such as cotton waste.

The rear end of the tray terminates adjacent the scraper receiving notches 22 in which is swingingly mounted the ends of the scraper bar 90 having trunnions 91 at both ends journalled in hangers 92 which may be in the form of staples driven into the angular edges of the notches 22. The upper edge of the scraper bar is located adjacent the rear edge of the tray and may be slightly above the same as shown in Fig. 5, while the lower edge thereof is rounded off to provide a smooth bearing on a rug or carpet over which it is reciprocated and the rounded nose of said scraper bar is held in resilient contact with the surface over which the machine is operating by springs 93 mounted in the holes 23 and engaging the rear surface of said scraper bar.

Any suitable operating handle 94 is provided which has ends mounted in holes 95 in the straps 29.

In practice, any suitable cleansing or shampooing liquid is placed in the container 41 and preferably contains soap in some form. The desired flow of cleansing liquid is then regulated by the proper manipulation of the valve handle 52 so that said cleansing liquid will flow from the feed pipe 50 through the openings 54 into the trough 36, thence through the holes 37 on to the rough absorbent applicator mat 38 until such mat becomes saturated.

The revolving brush with the bristles thereof mounted along spiral lines contacting with the mat will produce suds from the cleansing liquid and also carry quantities of froth from said suds around with it to the surface over which the machine is running, and in the case of a rug, carpet, or the like, will shampoo, scrub or cleanse the same and the surplus froth will be scraped up by the scraper bar 90 and guided into the tray 83 where said surplus froth will be taken up by the absorbent material 89 and after said material has become saturated it may be removed and the liquid squeezed therefrom and said material replaced in the tray or new material may be placed in said tray.

Particular attention is to be called to the fact that the suds are produced from the cleansing liquid by the action of the brush on the saturated mat and said brush then removes the froth from the mat and applies it to the rug or carpet and the like. I have discovered that this is the only practical way of making suds so that the froth thereof can be applied directly to the article being cleansed by brush and maintain the active qualities of the cleansing liquid. It might be well to state that the flow of liquid through the mat must be sufficiently fast to maintain a continuous production of suds.

Of course I do not wish to be limited to the exact details of construction as herein shown, as these may be varied within the limits of the appended claims without departing from the spirit of my invention.

Having thus fully described my invention, what I claim as new and useful is:—

1. A rug shampooing machine, comprising a wheel supported frame, a brush rotatably mounted in said frame for engagement with a surface over which the machine is operated, a container for cleansing liquid removably mounted on said frame, a rough porous member to which is fed with the cleansing liquid from the container and which is in contact with the brush whereby the coaction between the brush and said member will produce suds from the cleansing liquid, a tray carried by the frame, a scraper bar associated with said tray and fore engagement with the surface over which the machine is operated to scrape the excess cleansing medium from said surface and direct said medium to the tray, absorbent material in said tray, and springs acting upon the scraper bar to normally hold it in contact with the surface over which the machine is operated.

2. A rug shampooing machine comprising a frame, wheels on which said frame is supported, a brush rotatably mounted in said frame, a container carried by said frame, an applicator body arcuate in cross section mounted in the machine frame, a rough porous mat mounted on the inside of said applicator body in engagement with the brush, a trough carried by said applicator body in communication with the mat, and means to feed a cleansing liquid from the container into said trough.

3. The structure set forth in claim 2, in combination with hangers carried by the container and overlying the ends of the applicator body, set screws having threaded connection with the hangers and engaging the applicator ends of the body to force the latter toward parts of the machine frame, and compressible pads mounted on the ends of the applicator body for contact with the machine frame.

4. In a device of the character described, a machine frame including side walls having applicator receiving notches extending into said side walls from the top edges thereof, the bottoms of said notches being arcuate and convex, wheels supporting the frame, a brush rotatably mounted in the frame and driven by said wheels, an arcuate applicator body having notches in the corners to define end extensions which extensions overlie the arcuate bottoms of the notches on the frame side walls and with the intermediate part of the applicator body between the side walls so that the longer or straight edges thereof may project below the apertures in the side walls, compressible pads carried by the end extensions and engaging the arcuate projections, a trough on top of the applicator body from which holes lead to the inside of said applicator body, a rough porous mat mounted on the inside of the applicator body, clamps to hold the straight edges of said mat in place, said mat being in the path of travel of the brush so as to be engaged thereby, a container mounted on the machine frame, a feed pipe leading from said container and located in the trough, and a valve in said feed pipe to regulate the flow of liquid from the container.

5. The structure set forth in claim 4, in combination with means to press the applicator body and associated parts toward the arcuate projections for adjusting the mat relative to the brush, and means for removing surplus cleansing medium from the article being cleaned subsequent to the brush applying said cleansing medium.

6. In a rug shampooing machine, a frame, wheels supporting said frame, a brush rotatably mounted in said frame and driven by the wheels, an applicator mounted in the frame and coacting with the brush, a container mounted on said frame, a valve connected to the outlet from said container, a horizontal feed pipe having one end in communication with the valve and the other end suitably anchored, said feed pipe entering a portion of the applicator and having a series of outlet apertures, and projections carried on the bottom of said feed pipe at suitably spaced intervals to cause any liquid running along the exterior of said feed pipe to drop therefrom.

7. In a machine of the kind described, a frame including side walls having elongated openings therein, straps carried by the frame and having portions spaced from said side walls and provided with elongated openings co-extensive with those in the side walls, other straps carried by the first mentioned ones and having portions thereof spaced from the respective straps by which they are supported and provided with holes in alignment with only the outer ends of the elongated openings, axles for projection through the holes in one of the last mentioned straps, and through said elongated openings, wheels mounted on said axles between the side walls and the contiguous straps, a brush mounted in the frame with the ends of its spindle projecting outside of the side walls between contiguous wheels whereby said brush may be revolved by the wheels, a trunnion at each end of the brush mounted in associated straps and entering the ends of the brush spindle and springs engaging the ends of the axles and the trunnions to normally hold said axles out of alignment with the holes in the second mentioned straps and maintain said wheels in contact with the brush spindle.

8. A machine of the kind described comprising a frame, a brush journalled in said frame, wheels to support said frame and drive the brush, a liquid container on said frame, means to distribute the liquid along a line from side to side of the machine, means to receive said liquid, applicator means to be supplied with liquid from the receiving means where it will be acted upon by the brush to create suds and the froth therefrom applied by the brush to the article being cleaned, means to scrape excess froth from said article, and means to receive said excess froth as it is scraped from the article.

9. The method of shampooing rugs and carpets on the floor, consisting of applying only the froth of suds to a brush, and then applying the froth on the brush to the article to be cleaned without wetting said article with liquid suds.

10. The method of shampooing rugs and carpets on the floor, consisting of applying only the froth of suds to a brush, then applying the froth on the brush to the article to be cleaned without wetting said article with liquid suds and removing excess froth from said article.

11. The method of shampooing rugs and carpets, consisting of applying the froth of suds to a brush, then applying only the froth on the brush to the article to be cleaned without wetting said article with liquid suds, and finally scraping all froth possible from said article.

WILLIAM B. RITTER.